United States Patent [19]

Hill et al.

[11] 4,243,640

[45] Jan. 6, 1981

[54] PROCESS OF EXTRACTION OF ALUMINUM VALUES FROM COAL ASH

[76] Inventors: Robert O. Hill, 24, Torwood Rd., Forest Town, Johannesburg, South Africa; Bernard Raistrick, 24 Wheatlands Rd. East, Harrogate, Yorkshire, England, HG2 8PX

[21] Appl. No.: 908,862

[22] Filed: May 23, 1978

[51] Int. Cl.$^3$ .............................................. C01F 7/66
[52] U.S. Cl. ................................. 423/132; 423/111
[58] Field of Search ..................... 423/125, 132, 111

[56] References Cited

U.S. PATENT DOCUMENTS

| | | | |
|---|---|---|---|
| 1,792,410 | 2/1931 | Buchner | 423/125 |
| 2,174,825 | 10/1939 | Freling et al. | 423/132 |
| 3,211,524 | 10/1965 | Hyde et al. | 423/132 |
| 3,240,562 | 3/1966 | Brown et al. | 423/132 |
| 3,383,166 | 5/1968 | Gerry et al. | 423/125 |
| 4,069,296 | 1/1978 | Huang | 423/132 |

FOREIGN PATENT DOCUMENTS 529570 12/1921 France ................................. 423/132

Primary Examiner—Herbert T. Carter
Attorney, Agent, or Firm—Lester Horwitz

[57] ABSTRACT

A process for preparing a solution of high aluminum content from the combustion residue of a solid carbon-containing fuel having a carbon content of 2% or less by weight and an iron content calculated as $Fe_2O_3$ of 4% or less by weight is described. The process consists of (a) pretreating said residue with nitric acid at a temperature lower than the next extraction stage which follows and removing the nitric acid solution from the residue and then (b) extracting said treated residue with nitric acid of strength about 30% to 65% by weight strength at about 100° to 225° C., the amount of nitric acid employed in said pretreatment step and in said extraction step being in excess of the cationic equivalent actually dissolved in each step.

10 Claims, 1 Drawing Figure

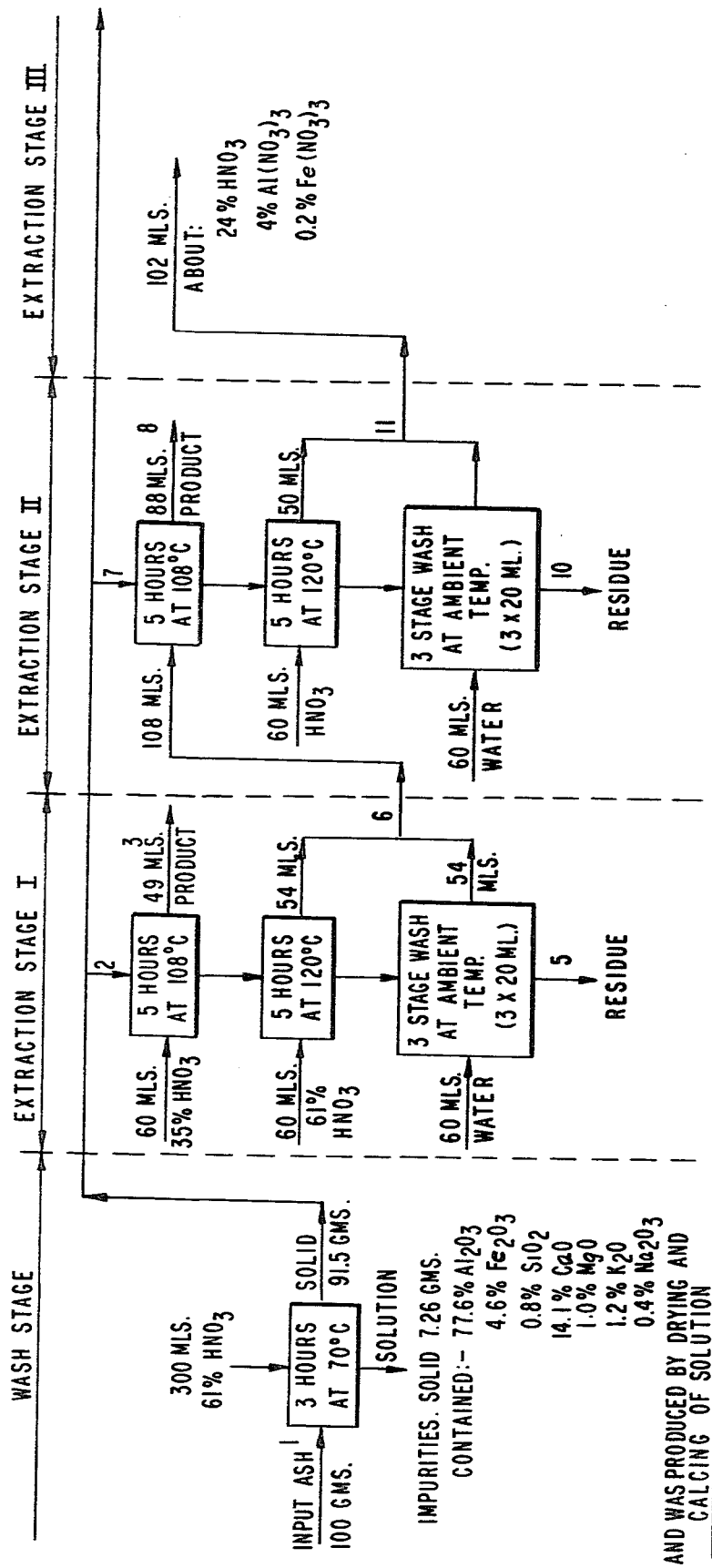

PROCESS OF EXTRACTION OF ALUMINUM VALUES FROM COAL ASH

At present the aluminum industry consists of two quite distinct processes which can be, and indeed often are, conducted in different locations. They are
(i) The production of alumina.
(ii) Its electrolytic reduction to metal.

Bauxite is the basic raw material for the production of alumina and the latter is obtained using the Bayer process which involves selective solution with caustic soda.

Many countries have little or no bauxite and, because prices of both it and the alumina made from it have risen sharply in recent years, alternative raw materials and processes are being widely sought. Clays fairly high in alumina content are the subject of most of the research and development work done in the last 20 years because they are indigenous to most countries and self-sufficiency is regarded as being important. But the economics of producing from clay (by extraction with hydrochloric, nitric or sulphuric acid) are calculated as being marginally less good than those from a new Bayer-type plant: moreover the latter process is well-established whilst no fullscale plant from clay has been operated. An improvement in the economics of one of the alternative processes is therefore required if the competition of the Bayer process using bauxite is to be met. This is the objective of the present invention.

*For a good survey of the present position relating to extraction from clay see "Environmental Considerations of Selected Energy Conserving Process Options: Vol VIII, Alumina/Aluminum Industry" A. D. Little Inc. Cambridge, Mass. Published by U.S. Dept. of Commerce, National Technical Information Service, PB-264 274, December 1976.

This invention relates to the production from coal ash (as hereinafter defined) of a nitric acid extract which is high in aluminum content and low in other constituents of coal ash. The solution of aluminum nitrate obtained can be worked up by known methods to give alumina of high purity.

Any freely available raw material containing a high proportion of $Al_2O_3$ equivalent must be regarded as a potentially attractive source of alumina because of the increasingly higher price of bauxite. The main raw material in this category, which has up till now received a great deal of attention, is clay. Coal ashes, which sometimes contain 30-40% $Al_2O_3$ equivalent—come into this group.

Both high-alumina clays and coal ashes contain about 30-40% $Al_2O_3$ and 40-60% $SiO_2$. To avoid solution of silica, extraction with nitric acid has been thoroughly studied in the case of clay. In this work the clay has been calcined at a controlled temperature, normally in the range 500°-800° C. depending on the type of clay being used. In the calcination, free water and water of hydration etc. are removed and the nitric acid attacks the clay more easily after calcination than prior to it.

Many coals are contaminated by clay-like impurities and coal ash might be a cheap alternative to the use of calcined clay if it were possible to discover an econimical way to extract its aluminum. When using coal ash there are no costs of clay mining, no costly calcination step is required, and we subtract from an existing environmental and disposal problem instead of creating one, as is the case if we use clay and discard the siliceous and other clay constituents. We would not expect coal ash to be as convenient a source of $Al_2O_3$ as is calcined clay because in the latter case the heat-treatment is carefully tailored to the clay, and to the process, for the sole purpose of facilitating the acid extraction which follows. In contrast, the production of coal ash is not at all tailored to provide a satisfactorily-extractable ash, as the objective in this case is rather to optimize the generation of heat from the combustion of the coal. Obviously, a calcination process cannot be equated to a combustion process in which the carbonaceous constituent of the coal is burning and heating the clay-like portion of the coal. The closest study of the inability to consider the ash from combusted materials as an equivalent to calcined clay prior to nitric acid attack is reported on pages 18 and 19 of the review "Aluminum from Indigenous UK Resources", Report No. LR 219 (ME), 1976, by P. Christie and R. Derry. Warren Spring Laboratory, wherein they state:

"In this country Rigg[19] has recently studied the extraction of aluminum from unburnt spoil materials by acid leaching. He has shown that it is necessary to heat unburnt spoil to between 600° and 800° prior to leaching in order to enable high extractions to be achieved but that if heated above 800° C. the extraction of aluminum falls. During the uncontrolled burning of spoil in a tip, much of the spoil is likely to have reached temperatures much above 800° C.; thus it is to be anticipated that aluminum extraction from burnt spoil by acid leaching will not result in high extractions. However, since preheating to 6°-800° C. is beneficial the possibility of autogenously burning the spoil under controlled conditions prior to acid extraction of the aluminum is worth considering. Unburnt spoil has a calorific value of between $2.8-4 \times 10^6$ Btu per tonne ($2.96-4.23 \times 10^9$ J tonne$^{-1}$) and the NCB have shown that it will burn without any extra fuel input in a fluidized bed combustion apparatus at a bed temperature of around 800° C. However, even under such controlled conditions individual particles reach much higher temperatures and since the autogenous combustion will not proceed below an average temperature of 800° C. it is unlikely that this particular process could be used to enhance the reactivity of unburnt spoil prior to acid leaching."

*19. Rigg, T. Private Comm.

The importance of the coal burning temperature can be observed from the relative ease of extraction of alumina from (a) fly ash and (b) fluidized bed ash. The latter is much easier to extract than the former and hence fluidized bed ash in our process is extracted in hot or boiling nitric acid at atmospheric pressure whilst fly ash requires to be extracted at higher temperatures under pressure. This is the case even though the chemical analysis of the two ashes can be virtually identical. A study by X-Ray diffraction and microscopy of the chemical phases actually present in the two ashes provides the key to understanding the difference between the two in regard to their ease of extractability. In the case of a typical fluidized bed ash the presence of an amorphous phase and of metakaolinite along with some quartz can be identified. In the case of fly ash the presence of a glassy phase and of mullite in considerable quantity can be observed.

Fluidized bed ash is normally formed at 800°-900° C. and fly ash at 1300°-1600° C. We have heated the fluidized bed ash at 1400° C. and find that after this treatment metakaolinite disappears and mullite becomes a major phase present: indeed, fluidized bed ash calcined at 1400° C. is virtually indistinguishable from fly ash. We conclude that fly ash is produced at temperatures which favor the formation of mullite, and when the latter is present the alumina in the ash is less readily soluble than in the case when the temperature of formation of the ash is too low to cause its formation—and this is the case when fluidized bed ash is formed. The conditions required for the formation of metakaolinite and of mullite have been reported on by J. D. C. McConnell and S. G. Fleet, Clay Minerals (1970) 8 279-290; these authors point out that metakaolinite formed at 800° and the amorphous phase obtained by heating it at about 900° are both finely porous, we conclude that this will facilitate solution in nitric acid. Mullite begins to be formed at 950° and is present in large quantity at temperatures in excess of 1150°; the surface area of this mullite-containing product is much lower than that of the 800°-900° product and the surface area becomes much lower still at temperatures of 1250° and above.

As stated, coal ash is a by-product of a power-generating operation, whilst calcined clay is a product tailor-made for alumina-extraction; the latter will normally be more suitable for the use therefore. But in addition it must be observed that in the United States Bureau of Mines and other literature publications the economic and other calculations are done on the assumption of using "the hypothetical clay".

For chemical analysis of this material see Margolin, S. V. and Hyde, R. W., the A.D.L. Nitric Acid Process for Recovery of Alumina from Aluminum Bearing materials, TMS-AIME, Paper No. A74-49, 1974; Proc. of Light metals, 103 AIME Am. Meeting, 1974 Vol. 2, pp. 469-487. U.S. Pat. No. 3,586,481; Johnson, P. W., Peters, F. A. and Kirby, R. C., Methods for Producing Alumina from clay. An evaluation of a nitric acid process-USBM, 1964, R.I. 6431. This "hypothetical clay" material is assumed to contain about 2% of impurities and 98% of alumina and silica equivalents: this composition is equivalent to a calcined high-grade kaolinite which typically would contain 44-45% $Al_2O_3$ and 53-54% $SiO_2$. Our own coal ashes are much less pure than this and contain ($Al_2O_3+SiO_2$) equal to only 80-95% after making allowance for moisture and carbon contents and can be as low as 70% after allowing for moisture only. In coal ash the carbon content can be in excess of 10%, and the cationic purities rising to 15%. Accordingly, in our invention there will be decarbonization and/or magnetic separation when required and a nitric acid pretreatment before the extraction. Needless to say, our preferred coal ash for this process would be (i) low in carbon and cationic impurities and (ii) readily attacked by nitric acid in regard to rate of aluminum solubility.

In accordance with this invention there is provided a process for preparing a solution of high aluminum content from the combustion residue of a solid carbon-containing fuel, the residue having a carbon content of 2% or less by weight and an iron content calculated as $Fe_2O_3$ of 4% or less by weight, which comprises:

(a) pretreating said residue with nitric acid at a temperature lower than the extraction stage(s) which follows and removing the nitric acid solution from the residue and then (b) extracting said treated residue with nitric acid of strength about 30% to 65% by weight strength at about 100° to 225° C.

The amount of nitric acid employed in said pretreatment step and in said extraction step being in excess of the quantity of cations actually dissolved in each said step.

According to the invention, the method of obtaining a nitric acid solution containing a considerable proportion of aluminum and few impurities involves some or all of the following three preliminary sequential purification steps followed by the aluminum extraction stage. Of the three purification steps, only the "wash stage" or "pretreatment stage" prior to extraction is essential to the invention.

The first Purification Step involves the removal (if necessary) of carbon from the coal ash by subjecting it to heat in the presence of air. This is done at a temperature high enough, and for a period long enough, to reduce the content of carbon and other carbonaceous matter to a low level. The temperature must not be too high, or slow solution of aluminum results. If high carbon is not reduced there is wastage of nitric acid in the later processing stages. The carbon in question is that which remains in coal ash after combustion and we prefer it to be less than 2% by weight, otherwise decarbonization is desirable. The exact proportion of carbon which can be tolerated depends, amongst other things, on the local cost of nitric acid. Carbon causes it to decompose, for example in accordance with the equation

$$3C+4HNO_3=4NO+3CO_2+2H_2O$$

The Second Purification Step involves the removal if necessary of a substantial part of the iron-containing compounds in the ash by magnetic separation. The final alumina product must have a low Fe/Al ratio and this is achieved partly by careful control during the stages of processing the aluminum nitrate solution. This processing is easier to operate if the Fe/Al ratio in the aluminum nitrate solution is itself as low as possible. The magnetic separation operation contributes to achieving a low ratio by removing as much iron as is economically possible in this Purification Step. A typical reduction is to one-quarter of the iron originally present, for example from 6% $Fe_2O_3$ to 1½% $Fe_2O_3$ at the expense of discarding about 10-30% of a high-iron fraction of the coal ash. We prefer to do the magnetic separation in the aqueous slurry state but a dry separation can be used if that happens to be more convenient.

It is possible, if carbon removal and iron-containing compound removal are both required before the "wash stage" or "pretreatment stage" to effect these removals in any desired order. However, the preferred method is to effect carbon removal first and then proceed to the removal of the iron-containing compound.

The Third Purification Step (the "Wash Stage" or "Pretreatment Stage") involves treating the coal ash, (after decarbonization and magnetic separation as necessary), with a nitric acid which can be weaker than the nitric acid used in the Aluminum Extraction Stage. The temperature of the acid is also lower than that used in the later Aluminum Extraction Stage. The purpose of the Third Purification Stage is to dissolve away from the coal ash as much as possible of such impurities as calcium, magnesium, sodium, potassium, titanium etc. and, particularly as much as possible of the iron remaining after the magnetic separation. If these impurities are not separated in this step they appear to some extent in the aluminum nitrate solution which is the end-product of this invention. The strength of acid and the temperature and time used in the Third Purification Step are chosen to give optimum solution of impurities combined with minimum solution of aluminum. The actual optimum values of acid strength, temperature and time used in the wash stage vary somewhat from ash to ash, and particularly in respect of the temperature achieved by the ash during the coal-combustion process.

In this pretreatment process the nitric acid is used in excess over the amount required to dissolve the desired proportion of cations in this pretreatment stage. The amount of nitric acid utilized is equivalent to about 100 to 300% of that required to dissolve all the $Al_2O_3$ present in the combustion residue. As a practical matter, the pretreatment only dissolves about 10% by weight of the cations present in the residue and in turn the cations in the residue are present only to the extent of about 40% by weight of the total residue. Accordingly, the true excess of nitric acid actually employed is in the range of 4 to 8 times the amount of nitric acid solution necessary to dissolve the cations actually removed from the residue during this pretreatment step.

The nitric acid solution of impurities is removed from the process, for example by settling and filtration, prior to use, as a by-product; for example as an ingredient of nitrogen-containing fertilizers or for recovery of nitric acid by the action of heat.

The Aluminum Extraction Stage comes now. It involves treating the coal ash, purified as above, with nitric acid of 30–65% $HNO_3$ strength, and preferably of 55–60% strength to minimize evaporation costs at a later stage. Once again the choice of acid strength, temperature and time of extraction depends on the nature of the ash and particularly on its temperature of formation. To take an example, fly ash is produced at above 1100° C. and is found to be relatively difficult to extract and therefore requires a higher extraction temperature etc; on the other hand ash produced by fluidized bed combustion is formed at about 800°–900° C. and is much easier to extract.

The extraction of fly ash is best done at 150°–225° C. and preferably 160°–200° C.; the treatment takes place under pressure. In the case of batch extraction the time is normally chosen to permit at least half the aluminum present in the purified fly ash to be taken into solution and is typically 3 hours.

The extraction of fluidized bed ash is best done at 100°–130° C. and preferably at 105°–122° C.; the latter range relates to the boiling points of nitric acid of 30–65% concentration under atmospheric pressure. Alternatively a staged counter-current extraction process may be used to minimize the consumption of nitric acid per ton of aluminum extracted.

In the extraction stage an excess of nitric acid over that required to dissolve the aluminum cation is employed. The quantity preferably employed is 300% to 600% of the amount of nitric acid solution necessary to dissolve the aluminum cations taken up from the residue during extraction. The amount of aluminum extracted depends on practical considerations. These are the economically acceptable amounts of aluminum dissolved in the course of the time and temperature employed.

The solution obtained as a result of the Extraction Stage is separated, for example by settling and filtration. It is then worked up by known processes to give a high purity alumina, for example by recrystallization of $Al(NO_3)_3 \cdot 9H_2O$ followed by heat decomposition of the latter to give alumina and most of the nitrate content as nitric acid. The final proportion of nitrogen needs to be driven off as oxides of nitrogen, the latter also being recycled after reconversion to nitric acid. The recrystallization of aluminum nitrate is to separate the small amounts of iron, calcium and other contaminants and to permit the production of an alumina product which meets the desired specification in regard to chemical impurities. As usual, any contaminated nitric acid liquors can be used in fertilizer manufacturing processes to take advantage of their nitrogen values. The solid remaining after the Aluminum Extraction Stage is relatively low in aluminum and impurities and high in silica. It can be discarded or used in the production of refractories or zeolites etc.

According to the process of this invention the ratio of aluminum content to combined cations is improved by a factor of 9 to 15 in the case of fly ash and by a factor of 2 to 5 in the case of the fluidized bed ash.

The fly ashes chosen for the process of this invention preferably contain 30 to 35% by weight $Al_2O_3$ equivalent and this is usually associated with 2 to 8% $Fe_2O_3$ equivalent, 45 to 55% $SiO_2$, 8 to 12% other impurities, with the remainder being carbon and water. These other impurities are generally calcium, magnesium, potassium, sodium and titanium values.

In the final solution from the fly ash the ratio of $Fe_2O_3$ to $Al_2O_3$ has been reduced by a factor of about 10 whilst the remaining (or other) impurities has been reduced by a factor of 10 to 15.

The fluidized bed combustion system is favored for coals and colliery residues which have a relatively high ash content. It has been our experience that ashes high in alumina and relatively low in iron content are available from fluidized bed combustion more so than is the case from pulversized fuel burning.

The improvement in the proportion of alumina to iron and other impurities achieved in the case of fly ash has not been achieved in the case of fluidized bed ash for 2 main reasons (a) the aluminum in the fluidized bed ash dissolves relatively quickly and therefore the effective separation from iron and the impurities realized in the case of fly ash in the wash stage cannot be achieved in the case of the fluidized bed ash and (b) the impurities in fluidized bed ash tend to be at a lower level to begin with and therefore the opportunities for improvement are less available.

Our experience is that in the case of the fluidized bed ash the improvement in the ratio of $Al_2O_3$ to $Fe_2O_3$ is about 2 and in the case of "other" impurities the improvement is approximately 5.

Coal ash is a product which is produced in coal-burning power stations and similar processes. The commonest form of coal ash is fly-ash, which is the solid product remaining from the combustion of pulverized coal. Another form of coal-ash is the solid product obtained from the combustion of a coarser size of coal in a fluidized bed unit: the ash obtained from this kind of plant has normally been exposed to rather lower temperatures than is the case with fly ash and the use of this kind of ash in our process proceeds rather differently as has already been indicated. The fluidized bed process of combustion is only in its infancy at present but the prospects for it are excellent. This is on account of its ability to accept very low grade coals and even colliery wastes, in which the ash content is often considerably greater than the content of combustible matter.

The major ingredients of fly ash are alumina and silica in the form of mixed compounds such as mullite ($3Al_2O_3 \cdot 2SiO_2$) and vitreous materials. The impurities are present in smaller amount than are the two major ingredients and iron oxides and carbon are two of the main ones. By way of example, the analysis of a certain Sourth African fly ash very high in carbon (from an old power station) is as in Table 1. It has been dried at 130° C.

TABLE 1

| | | |
|---|---|---|
| Al$_2$O$_3$ | 27.8 | |
| SiO$_2$ | 38.7 | |
| Fe$_2$O$_3$ | 5.0 | |
| Carbon | 16.0 | |
| Other ignition loss | 6.2 | |
| Minor ingredients | 6.3 | |
| CaO | | (1.6) |
| MgO | | (1.8) |
| K$_2$O | | (1.8) |
| Na$_2$O | | (0.6) |
| TiO$_2$ | | (0.5) |
| | 100 | |

(The minor ingredients are estimates)

In the light of what has been said before it is clear that this particular ash is much too high in carbon to be processed without the use of the decarbonzation step. The heating for decarbonization can, for example, take place in a fluidized bed or other calcination equipment. Some coal ashes will contain sufficient carbonaceous material to provide the heat for this stage. If the carbon content is too low to provide the necessary heat then the decarbonization step will frequently be unnecessary. By way of example the South African fly ash described above has the analysis given in Table 2 after calcination at 950° C.:

TABLE 2

| | |
|---|---|
| Al$_2$O$_3$ | 35.7 |
| SiO$_2$ | 49.8 |
| Fe$_2$O$_3$ | 6.4 |
| Minor ingredients | 8.1 |
| | 100.0 |

A high-alumina fluidized bed ash has the composition given in column 1 of Table 3.

TABLE 3

| | 1. | 2. | 3. |
|---|---|---|---|
| Al$_2$O$_3$ | 38.2 | 31.6 | 36.0 |
| SiO$_2$ | 48.6 | 58.0 | 53.9 |
| Fe$_2$O$_3$ | 2.4 | 2.9 | 1.7 |
| CaO | <0.1 | 1.3 | 1.3 |
| MgO | <0.1 | 1.4 | 1.4 |
| TiO$_2$ | 0.5 | 1.8 | |
| Na$_2$O | 0.2 | 0.3 | 0.2 |
| K$_2$O | 1.9 | 2.2 | |
| Carbon | 6.6 | 0.4 | 0.4 |
| Moisture | 1.0 | | |

This is from the interceptor cyclones following the combustion chamber and is unduly high in carbon. For most of our work we have therefore used an ash such as is given in column 2, which is from the bed itself rather than from the cyclone separators. After having been subjected to some screening and to a magnetic treatment to reduce the level of Fe$_2$O$_3$ the composition of the ash was as given in column 3 and it has been used for much of our practical work.

Two ways of extracting alumina from coal ash are (i) by batch extraction and (ii) counter-current flow extraction. Our process can use either procedure and examples of both are given later.

The use of fluidized bed ash in our process brings with it one enormous advantage as compared with the use of fly ash: it is that the alumina is relatively easily extracted at atmospheric pressure by nitric acid at the boiling point or even below. But an important disadvantage accompanies the advantage. It is that the alumina is so readily dissolved that a purification depending on the relative solubilities of Fe$_2$O$_3$ and Al$_2$O$_3$ in the nitric acid wash stage, such as applies in the case of fly ash, is difficult to achieve. The wash stage in the case of fluidized bed ash is therefore largely to reduce impurities such as calcium, magnesium, sodium and calcium and gives very little improvement in the Fe$_2$O$_3$/Al$_2$O$_3$ ratio in the washed solid. In contrast the Fe$_2$O$_3$/Al$_2$O$_3$ ratio in pulverized fuel ash can be considerably lowered in the wash stage.

EXAMPLE 1

100 Parts of dry fly ash (A in Table 4 below) were subjected to a very simple magnetic separation process. 11 Parts of the ash were removed on account of their high iron content and 89 parts of material B remained. The carbon content of this ash was low and therefore no decarbonization step was necessary.

In the nitric acid purification step material B was subjected to extraction in a batch treatment process using 35% HNO$_3$ at the boiling point of 110° C. Each batch treatment used 9½ liters of acid liquid to 1 kilogram of material B. In this treatment the weight loss of the solid was 12.6% and 78 parts of residue C (dry basis) were obtained. The latter was now subjected to the aluminum extracttion stage using 61% HNO$_3$. A batch treatment was again used, 230° C. being the extraction temperature and 2 hours using 20 liters of acid per kilogram of C being the conditions for each batch operation. The residual solid was separated from the acid by filtration and weighing showed a weight loss of 28.2%, leaving 56 parts of D. The solution of aluminum nitrate in nitric acid was not subjected to any further purification in this instance but was simply evaporated to dryness and calcined at 1000° C. prior to analysis to determine the amounts of aluminum and of impurities dissolved by the treatment. The calcined material represented 18 parts by weight of the original ash and its X-Ray diffraction pattern showed it to be alpha-alumina. The analysis of the calcined material is given at E. The remaining 4 parts of C not accounted for correspond to the oxidation of carbon content in the aluminum extraction stage.

TABLE 4

| | A | B | C | D | E |
|---|---|---|---|---|---|
| Al$_2$O$_3$ | 31.7 | 30.9 | 27.6 | 10.6 | 95.6 |
| SiO$_2$ | 50.9 | 53.3 | 61.7 | 83.3 | 0.6 |
| CaO | 5.9 | 5.9 | 1.5 | 2.4 | 1.3 |
| MgO | 2.0 | 2.2 | 0.6 | 0.6 | 0.6 |
| Fe$_2$O$_3$ | 6.1 | 3.2 | 2.4 | 1.3 | 1.8 |
| TiO$_2$ | 1.0 | 0.9 | 1.4 | 0.7 | 0.2 |
| Na$_2$O/K$_2$O | 0.6 | | | | |
| L.O.I. | 2.2 | 3.1 | 4.6 | Nil | Nil |
| | 100.4 | 99.7 | 99.8 | 98.9 | 100.1 |

EXAMPLE 2

100 Parts of dry fly ash (A in table 5 below) were subjected to a commercial-scale magnetic separation process whereby 29 parts of B were removed and 71 parts of C remained. The latter was then treated in the nitric acid purification step with 35% HNO$_3$ in a batch treatment process. Two hours at 110° C. (boiling point) was given in each stage. Approximately 3 liters of nitric acid-containing liquor was used in each stage per kilogram of ash. In this purification step the weight loss of the solid was 9.5% and 64 parts of dry residue D were obtained. The filtrate, after drying and calcining had the composition E: the effectiveness of impurity removal can be observed.

The solid D was now subjected to the aluminum extraction stage using 61% $HNO_3$ by batch extraction using a ratio of 3 liters of acid liquor per kilogram of solid in each batch. The extraction time of each batch was 4 hours and the temperature 165° C. The solid F (53 parts) was separated from the acid liquor and had the composition shown. The filtrate solution, without any attempt at further purification, was evaporated to dryness and calcined at 1000° C. to give B parts of solid G. X-Ray diffraction study of G showed it to be alpha-alumina. The remaining 3 parts of D not accounted for correspond to the oxidation of carbon content in the aluminum extraction stage.

TABLE 5

|  | A | B | C | D | E | F | G |
|---|---|---|---|---|---|---|---|
| $Al_2O_3$ | 24.6 | 21.6 | 25.8 | 26.0 | 38.9 | 17.6 | 94.5 |
| $SiO_2$ | 55.7 | 47.8 | 58.9 | 64.7 | 0.4 | 76.3 | 0.2 |
| CaO | 4.4 | 4.9 | 4.2 | 0.5 | 41.4 | 0.9 | 1.3 |
| MgO | 1.4 | 1.7 | 1.3 | 0.4 | 11.5 | 0.5 | 0.6 |
| $Fe_2O_3$ | 7.3 | 21.0 | 1.6 | 1.3 | 6.3 | 1.1 | 2.6 |
| $TiO_2$ | N.D | N.D. | N.D. | 1.7 | 1.2 | 1.7 | 0.1 |
| L.O.I. | 3.6 | 1.3 | 4.6 | 5.3 | Nil | 1.6 | Nil |
|  | 97.6 | 98.3 | 96.4 | 99.9 | 99.7 | 99.7 | 99.3 |

EXAMPLE 3

The fluidized-bed ash used in this example was the 400–800 micron fraction from the bed itself. This fraction comprised 40% of the total bed ash. Its composition is given in column 2 of Table 3. N.B. 98% of the total bed ash had a composition $Al_2O_3 = 30.6 \pm 1\%$, $Fe_2O_3 = 3.1 \pm 0.2\%$ and L.O.I. 0.4–0.6%. The 2% of $-200$ micron material had L.O.I. $= 2.2\%$. After magnetic separation at 7000 gauss in a disc separator the low-iron residue had the composition given in column 3 of Table 3 and this raw material was used now for acid treatment. The low carbon content means that no decarbonization step is required in this case.

The ash was first subjected to a wash stage as shown in FIG. 1., 61% $HNO_3$ was used at 70° C. for 3 hours. It will be seen that although considerable solution of calcium took place there was also considerable solution of alumina and no improvement in the $Fe_2O/Al_2O_3$ of the residual solid took place. A series of extraction stages at the boiling point was then done using 61% $HNO_3$ at 120° C. with the first extraction in any stage being done using a combination of the liquids from the second extraction and the wash from the previous stage and the solution from this extraction containing the product aluminum. The solution usually contained 88–95% $Al_2O_3$ with some iron and other impurities. This solution is now suitable for further conversion to alumina by known techniques such as crystallization and ion exchange to reduce the iron content, hydrolysis by heat to give nitric acid for recycling and calcination to provide pure alumina. It will be noted that in the second stage of extraction the $Al_2O_3$ recovery in the product solution is $$\frac{1.83 \times 100}{(0.61 + 6.12)} = 27\%$$

Higher recoveries can be achieved if required by variations of temperature, time and acid strength but some of these bring obvious disadvantages. Since coal ash is a waste-product we have so far preferred to minimize the operating problems at the expense of discarding half to three-quarters of the aluminum originally present in the ash.

In this trial therefore a typical product solution, when calcined for purposes of analytical examination, contained 90% $Al_2O_3$, 4.6% $Fe_2O_3$ and 5% other constituents, mainly $K_2O$. The 5% can be reduced somewhat by better liquid-solid separation operations than were used in this example. It will be noted that failure to operate the nitric acid pretreatment step would have given a product solution of considerably lower purity than that actually obtained.

We claim:

1. A process for preparing a solution of high aluminum content from the combustion residue of a solid carbon-containing fuel obtained by a combustion procedure wherein said residue is formed at a temperature substantially above about 800° C. and wherein said residue has a carbon content of 2% or less by weight and an iron content calculated as $Fe_2O_3$ of 4% or less by weight which comprises:
   (a) pretreating said residue with an amount of nitric acid substantially equivalent to about 100 to 300% of that required to dissolve all the $Al_2O_3$ present in the combustion residue for a time to effect substantial dissolution of calcium, magnesium, sodium, potassium and titanium impurities and to leave aluminum substantially undissolved, separating the residual, and then
   (b) extracting said treated residue with nitric acid of strength about 30% to 65% by weight strength at about 100° to 225° and in a quantity equivalent to 300 to 600% of the amount of nitric acid solution necessary to dissolve the aluminum cations taken up from the residue during extraction, said temperature being higher than that employed in the pretreatment step.

2. A process according to claim 1 wherein said residue is an ash obtained by fluidized bed combustion and said nitric acid pretreatment is at a temperature of about 40° to 90° C. for about 1 to 5 hours with nitric acid of strength about 30 to 65% by weight and said extraction is at a temperature of about 100° to 130° C.

3. A process according to claim 2, wherein in order to produce said residue having the required carbon content of 2% or less a residue of a solid carbon-containing fuel is oxidized in the presence of air to reduce its carbon content prior to said pretreatment.

4. A process according to claim 3, wherein after said heating in the presence of air the so-treated residue is subjected to a magnetic separation process to reduce its iron content calculated as $Fe_2O_3$ to 4% or less prior to said pretreatment.

5. A process according to claim 2, wherein in order to produce said residue having the required iron content of 4% or less calculated as $Fe_2O_3$ a residue of a solid carbon-containing fuel is subjected to a magnetic separation process to reduce its iron content prior to said pretreatment.

6. A process according to claim 1, wherein said residue is an ash obtained from the process of combusting of pulverized coal and said nitric pretreatment is at a temperature of about 100° to 120° C. for about 1 to 5 hours with nitric acid of strength about 30 to 65% by weight and said extraction is at a temperature of about 150° C. to 225° C.

7. A process according to claim 6, wherein in order to produce said residue having the required carbon content of 2% or less a residue obtained from the process of combusting pulverized coal is heated in the presence of air to reduce its carbon content prior to said pretreatment.

8. A process according to claim 7, wherein after said heating in the presence of air the so-treated residue is subject to a magnetic separation to reduce its iron content, calculated as $Fe_2O_3$ to 4% or less prior to said pretreatment.

9. A process according to claim 6, wherein in order to produce said residue having the required iron content calculated as $Fe_2O_3$ of 4% or less a residue obtained from the process of combusting pulverized coal is subject to a magnetic separation to reduce its iron content prior to said pretreatment.

10. A process according to claim 1 wherein the quantity of nitric acid employed in said pretreatment step is about 4 to 8 times the amount of nitric acid solution necessary to dissolve the cations actually removed from the residue during said pretreatment step.

* * * * *